May 20, 1930.　　　　J. B. MURPHY　　　　1,759,019

ELECTRICAL TESTING SYSTEM

Filed Jan. 13, 1926

INVENTOR
J. B. Murphy

BY

ATTORNEY

Patented May 20, 1930

1,759,019

UNITED STATES PATENT OFFICE

JOHN B. MURPHY, OF LOS ANGELES, CALIFORNIA, ASSIGNOR TO AMERICAN TELEPHONE AND TELEGRAPH COMPANY, A CORPORATION OF NEW YORK

ELECTRICAL TESTING SYSTEM

Application filed January 13, 1926. Serial No. 81,096.

This invention relates to electrical testing systems, and particularly to a system of that type adapted to indicate the existence of low insulation upon an electrical distribution system, and also characterized by means to determine the location of the source of the said low insulation.

In the operation of electrical distribution systems, particularly those employed in signaling, it is desirable to know at all times the condition of the insulation of such a system. This is especially true in the case of a telephone distribution system employing cables in which a very large number of conductors are grouped together within the sheath of the cable. In the maintenance of a telephone cable system trouble arises from a lowering of the insulation resistance of the conductors of the cable due to moisture penetrating the cable through an opening in the metallic covering thereof either at the splices between adjacent sections, or on the sections themselves. While instances are known where this penetration of moisture occurs at a rapid rate so that the insulation of all of the conductors is lowered within a short time, in the majority of instances, however, the infiltration of moisture is at a much slower rate, so that there is an appreciable difference of time between the instant when a lowering of the insulation resistance occurs upon the outermost conductors, namely, those closer to the sheath, and the instant when the moisture reaches the innermost conductors.

This invention resides in a method and means for indicating a lowering of the insulation resistance of a system of electrical conductors, which indication is given when moisture begins to penetrate the sheath of the cable. Another object of this invention is to determine the approximate location of the source of trouble producing the lowering of the insulation resistance.

Figure 1:
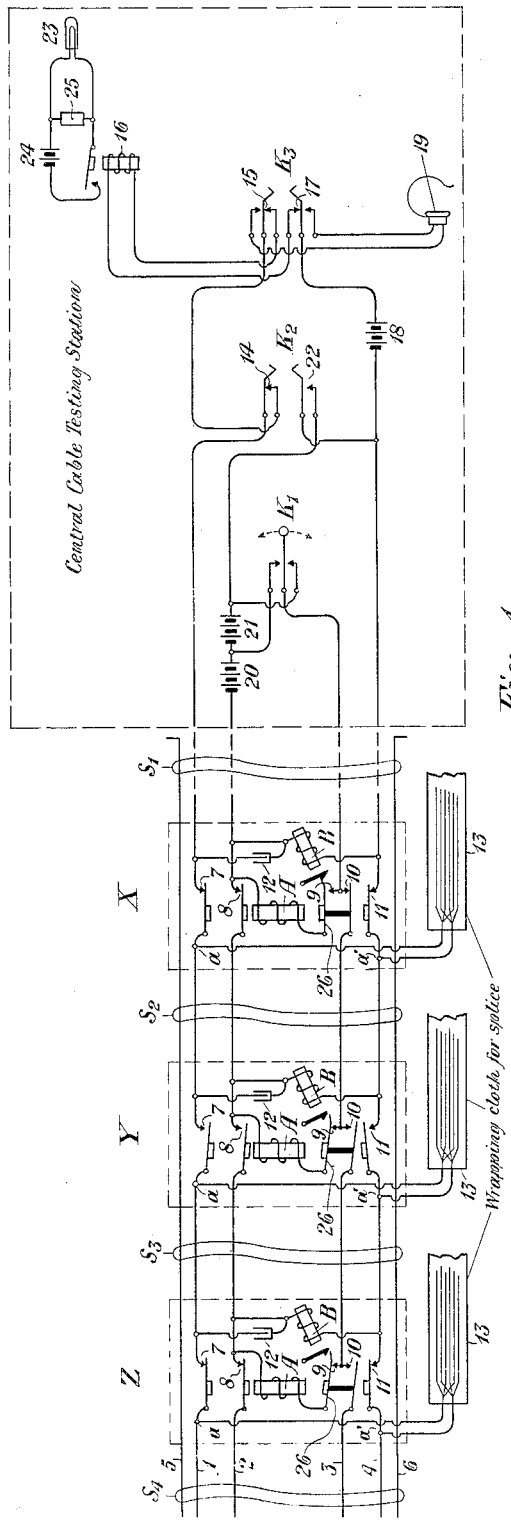
Figure 2:
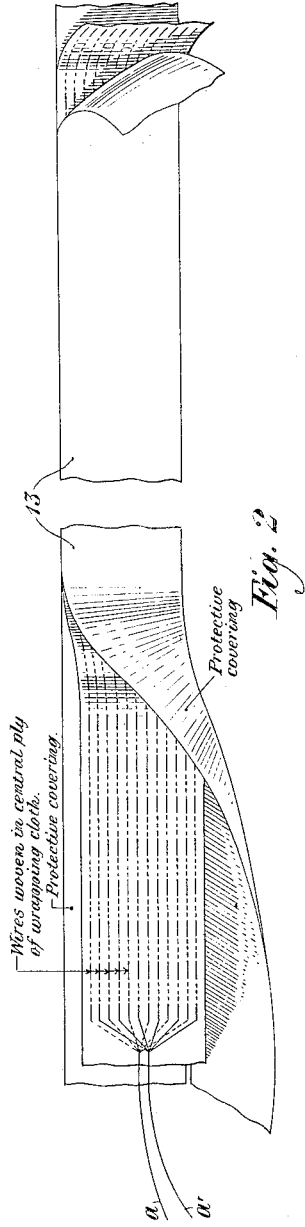

Other objects of this invention will be apparent from the following description when read in connection with the drawing, of which Figure 1 shows schematically a form of embodiment of the invention and Fig. 2 shows a detail thereof.

In Fig. 1 the conductors 1, 2, 3 and 4 represent a plurality of wires by means of which indication is given at a central testing point of a threatened failure of an electrical distribution system such as a telephone cable. These conductors would preferably be within the same cable sheath as other conductors, such as 5 and 6, which are intended to symbolize a plurality of conductors employed for other services than testing, such as the transmission of speech or telegraph signals or of power. The cable, of which the conductors 1 to 6, inclusive, form a part, would comprise a number of sections which are spliced together at many points throughout its completed length. At predetermined intervals throughout its length, as for example, at every third splicing point, the testing conductors 1 to 4, inclusive, would be connected through the contacts of relays, and special apparatus would be installed in order to attain the object of the invention. Such points are designated on the drawing by X, Y and Z. At each of these testing points are inserted the relays A and B. Relay A has one of the terminals of its winding connected with the contact point 8 of that relay, to which is also connected conductor 2 of the section of cable designated $S_1$. The other terminal of its winding is connected with the armature 26, which armature effectively connects the winding with conductor 3 of section $S_1$ whenever contact 9 is closed. Conductor 3 of section $S_1$ is so connected with the contact points 9 and 10 of relay A that the same conductor will be connected with the winding of relay A when contact 9 is closed and with conductor 3 of section $S_2$ when contact 10 is closed. Relay B is connected with conductor 1 of section $S_1$ through the condenser 12, and also is connected directly with conductor 2 of section $S_1$, and the other terminal of its winding is connected with conductor 4 of section $S_1$, which conductor is connected through contact 11 of relay A with conductor 4 of section $S_2$. In like manner conductor 1 of section $S_1$ is connected through contact 7 with conductor 1 of section $S_2$. Relay A, as will be more clearly described hereinafter, is designed to be partly operated upon the application thereto of a relatively low voltage, such as 24 volts, and to be completely operated upon the application of a higher voltage, such as 48 volts. When it is completely operated the lower armature 26 will be lifted sufficiently high as to be caught and held by the armature of relay B, thus opening contact 9 and closing contact 10; and for reasons which will be made clear later, the armature 26 of relay A will be released upon the operation of relay B. Bridged across conductors 1 and 4 at the points $a—a'$, are conductors leading to a group of closely spaced test wires, which, however, are insulated each from the other. Alternating wires of this group are connected with terminal $a$, and the wires of the adjacent group are connected with terminal $a'$. These wires that form these groups are preferably woven into a cloth that is employed in wrapping the splices of a cable. This is clearly shown in Fig. 2, which represents a section of a three-ply wrapping cloth. The inner ply contains the wires which are insulated each from the other by the fibers that are employed in weaving the cloth. The corresponding ends of alternate wires, as for example, the left-hand ends, are joined together and connected by a conductor with the point $a$ upon the test conductor 1, and the similar ends of the other wires are joined together and connected by a conductor with the point $a'$ upon the test conductor 4. It will of course be apparent that after this protective wrapping has been placed around the bundle of wires at the splices, if moisture penetrates this covering the fiber between the conductors in this wrapping will absorb moisture and the insulation resistance between the conductors will be reduced. If the resistance falls to a predetermined level, a signal will be given at a central testing point, the manner of doing which will be clear from subsequent description.

It will be seen that at each testing point the transmission conductors, of which 5 and 6 are symbolic, will be spliced together so that the conductors are continuous therethrough. The testing conductors 1 to 4, inclusive, will be connected at each testing point in the manner described before and shown on the drawing. The testing conductors in the sections to the right of each testing point are connected with contact elements of relay A, and the testing conductors in the sections to the left of the testing points are connected with armatures of relay A. The equipment and arrangement of the said equipment are the same at all testing points. In the drawing the armatures of relay A are shown in different positions at the various testing points in order to illustrate clearly the manner in which a location is made of a source of low insulation. It should be noted at the outset that the normal positions of the armatures of the relays A and B at all testing points, when the system is in its unoperated condition, should be the same as shown at testing point Z. The testing conductors 1 to 4, inclusive, are preferably extended to some central point, such as the central cable testing desk, where they would be connected with suitable testing keys and other apparatus. Conductor 1 is connected with the upper swinging contact of key $K_2$ and conductor 4 with the lower swinging contact thereof. The upper swinging contact of this key is normally closed through contact point 14 with the upper swinging contact of key $K_3$, thence through contact 15 with one of the terminals of the winding of relay 16, the other terminal of which is connected through contact 17 of the key $K_3$ with conductor 4, the connection including a source of potential 18, such as for instance a 48 volt battery. The outer contact points of key $K_3$ are connected with a telephone receiver 19 or other suitable indicating device. Conductor 2 is normally connected with the upper contact point of key $K_1$ through a source of potential 20, such as a 24 volt battery, and this conductor is also connected with the lower contact key $K_1$, the connection including not only the source 20 but also the source 21 of, say, 24 volts in series therewith. Conductor 3 is connected with the movable member of key $K_3$. Conductor 2 is also effectively connected with the lower contact point 22 of key $K_2$.

Having in mind the foregoing description of the apparatus shown in the schematic arrangement illustrated in the drawing, the manner in which a potential source of trouble is indicated and located will now be described. Let it be assumed that moisture has penetrated the wrapping cloth 13 at the testing point Z to such an extent as to cause such a lowering of the insulation resistance between the wires in the wrapping cloth as to permit current to flow from the source 18 through the moisture-soaked insulation between the wires of the wrapping cloth. As pointed out hereinbefore, the normal positions of the armatures of relays A at each of the testing points are the same as shown at point Z, so that when failure of the insulation occurs in the wrapping cloth of the splice at point Z, current will flow from the source 18 through contact 17 of key $K_3$, thence over a circuit including the winding of relay 16, contacts 15 and 14 of keys $K_3$ and $K_2$, respectively, and conductor 1 to point $a$ at the testing point Z, thence through the damp insulation between the groups of adjacent wires in the cloth 13 to point $a'$ of conductor 4, thence to the source 18. Relay 16 will be operated thereby, closing the circuit including the supervisory lamp 23 and the source 24. The lighting of this lamp or the giving of an equivalent signal by a buzzer 25 notifies the attendant that the insulation upon the test wires has fallen, and he immediately begins to locate the position of the splice in which the low insulation exists. In order to do this, key $K_1$ is moved to close its upper contact, thereby establishing a circuit from the source 20 through the upper contact of key $K_1$, conductor 3 of section $S_1$, contact 9 of relay A (it being remembered that the armature positions at this instant are at all testing points as shown at point Z), thence through the winding of relay A and over conductor 2 of section $S_1$ to the source 20. This effects only a partial operation of relay A, which partial operation includes the opening of contacts 7, 8 and 11. The opening of contacts 7 and 11 opens the circuit extending from the wrapping cloth conductors at each testing point to the supervisory signal 23, and therefore extinguishes that lamp. If the trouble existed in the section $S_1$ so that there was low insulation between conductors 1 and 4, the operation of relay A at point X would not effect the extinguishing of the lamp 23 because current would continue to flow between conductors 1 and 4 in section $S_1$ after the contact points 7 and 11 had been opened at point X. This shows that the trouble is beyond point X. Accordingly, key $K_1$ is operated to close its lower contact, thereby connecting sources 20 and 21 in series with the winding of relay A at point X. This combined voltage of, say, 48 volts effects the full operation of this relay, which opens its contact 9 and closes its contact 10. The innermost of the lower armatures is held by the armature relay B. It also disconnects the winding of relay A at point X from the circuit controlled by the key $K_1$, thereby rendering it possible to operate the relays A at the more distant points. As soon as relay A becomes locked in the manner shown and current ceases to flow through its winding, the upper and lowermost armatures will drop back, thus closing contacts 7, 8 and 11.

At this instant the positions of the armatures at the point Y will be the same as shown at point Z of the drawing, that is to say, contacts 7, 8, 9 and 11 of relay A, at point Y, are closed. The test man will operate the key $K_1$ upwards, thereby applying 24 volts from the source 20 over conductors 2 and 3 through contacts 8 and 10 of relay A at the point X to the winding of relay A at point Y. The partial operation of relay A at Y opens contacts 7, 8 and 11, as shown in the drawing, and since contact 10 at Y is already open, the test conductors to the left of Y, that is to say, more remote from the central testing station than Y, will be effectively disconnected from the apparatus at the testing station. If the low insulation existed upon the test wires between the contacts of relay A at the point Y and the armatures of relay A at the point X, which includes the groups of wires within the wrapping cloth at the point X, the signal 23 at the testing station remains lighted because the circuit remains continuous from the source 18 through the point of low insulation and the relay 16. It has been assumed that the trouble resided in the wrapping cloth at station Z, and therefore no indication of trouble would be given upon the opening of the contacts of relay A at Y as just described. The test man operates the key $K_1$ downwardly, which applies 48 volts from the source 20—21 to the relay A at Y, and locks this relay in the manner shown in the drawing at point X. The circuit is now complete to the point Z where a similar test is made by first applying 24 volts from the source 20 through the upper contact of key $K_1$. This test simply disconnects the sections of the test wires beyond the armatures of relay A at Z, and the lamp 23 will be extinguished, thus indicating to the test man that the trouble is beyond this point. The relay A at Z will be locked up in the same manner as those at X and Y, and a similar test will be made to the next testing point beyond Z. When the circuit is opened at this said next point, and the lamp 23 continues to give the signal, the test man knows that the trouble resides either in the wrapping cloth at the point Z or in the section of the cable $S_4$ between the point Z and the next point beyond.

It will be seen that the making of this test requires two operations, namely, the swinging of the key $K_1$ upward and downward so that the relays at a large number of points may be operated and the trouble located relatively quickly.

After the trouble has been located and cleared it is necessary to restore relays A at every point where they have previously been operated and locked up in order to render the system ready to function again in its normal manner. This restoration is effected by the operation of the B relays at each of the points where the A relays have operated. The operation of the B relays is effected by operating key $K_2$ which, by the closing of its lower contact 22, impresses 48 volts from the source 20—21 upon the relay B, the current flowing from the said source through contact 22, over conductor 4 through the winding of relay B, and returning over conductor 2. This attracts the armature of the B relays and releases the armature of the A relays, closing contact 9 and opening contact 10 at each of them. The positions of the armatures of the relays at each of the test points will be the same as is indicated upon the drawing at the point Z.

While the relays at each of the test points may be connected with the test wires in any desired way, a preferable form consists in arranging the relays and the condenser within a container that is relatively long with respect to its diameter and in enclosing this container within the sleeve that is placed over the spliced conductors. This avoids splicing a small cable into the larger cable at each test point, which practice would be necessary if the relays were mounted outside of the lead enclosure of the cable.

Throughout the description mention has been made of the use of the lamp 23 to indicate the presence or absence of trouble on the circuit, but it is desired to call attention to the fact that the receiver 19 may be employed for this purpose by operating the key K₃ which substitutes the receiver for the lamp.

The condenser 12, connected in series with the winding of relay B between conductors 1 and 4, constitutes an exploring coil that enables this testing arrangement to be used in a system in which an alternating current is transmitted over a defective pair in a cable. Thus assuming that conductors 5 and 6 represent a defective pair the defect consisting in a short circuit at a point in section S₃, if an alternating potential is applied across the distant ends of conductors 5 and 6 an alternating potential will be set up in the windings of the relays B, which are effectively bridged across the conductors 1 and 4. This will cause current to flow thereover, which will be heard by the receiver 19. The test man will operate relay A at station X so as to open contacts 7 and 11. Since the short circuit exists in section S₃ the potential causing the tone in the receiver is that induced across the winding of relay B at the point Z and beyond to the distant end of the cable. The opening of contacts 7 and 11 at X will therefore stop the tone in the receiver 19, indicating to the test man that the trouble lies beyond the point X. Similarly the operation of the relay A at Y causes a stoppage of the tone in the receiver 19. When the relay A at point Z is operated, opening contacts 7 and 11, the tone continues in the receiver 19 because the winding of relay B at the point Z is exposed to a section of the short circuited conductors 5 and 6. The test man therefore knows that the trouble lies between the points Y and Z, and in this manner it may be quickly cleared.

While this invention has been disclosed as embodied in a particular form, it is capable of embodiment in other forms without departing from the spirit and scope of the appended claims.

What is claimed is:

1. In an arrangement for determining the condition of insulation of an electrical transmission system, the combination with a cable comprising a plurality of sections each containing a plurality of insulated conductors enclosed in a sheath, the conductors of adjacent sections being spliced together, a wrapping cloth to bind together the spliced conductors at each splicing point, a plurality of test wires each separated from the others arranged within the said wrapping cloth, the said test wires being connected with certain of said conductors within the said cable, and signaling means connected with the said certain conductors operable whenever the insulation resistance between the said test wires falls to a predetermined level.

2. In an arrangement for determining the condition of insulation of an electrical transmission system, the combination with a cable comprising a plurality of sections each containing a plurality of insulated conductors enclosed in a sheath, the conductors of adjacent sections being spliced together, a wrapping cloth to bind together the spliced conductors at each splicing point, the said cloth having a plurality of test wires woven therein, the said test wires being connected with certain conductors in said cable, a plurality of relays at definite intervals along the said cable each having its armatures and contacts so connected that the said certain conductors will normally be rendered continuous throughout the said cable, a source of potential and switching means connected with the windings of the said relays to open the testing circuit of the said test wires at each testing point to determine whether the low insulation exists between the point of opening and the end of the cable at which the signaling means is located, and then to close the said testing circuit through the contacts and armatures of the said relay to the next testing point.

3. In an arrangement for determining the condition of insulation of an electrical transmission system, the combination with a signaling device of a source of potential and a plurality of conductors extending throughout the said system and connected with the said device and the said source to provide an alarm circuit which is normally maintained open by the insulation between the said conductors, and a plurality of relays, located at fixed points throughout the said system, having their armatures and contacts so connected with sections of the said conductors as to effectively connect and disconnect the said sections when the said relay is operated, and means to control the operation of the said relays whereby the approximate location of an insulation defect may be readily determined.

4. In an arrangement for determining the condition of insulation of an electrical transmission system, the combination with a cable comprising a plurality of sections, each consisting of a plurality of insulated conductors enclosed in a sheath, the said sections being spliced together, a circuit-controlling relay and a locking relay at certain of said splicing points, the armatures of the circuit-controlling relay being connected with certain of said conductors in the cable section lying on one side of said relay and the contacts of the same relay being connected with certain conductors on the other side thereof, switching means to apply a potential to the winding of each circuit-controlling relay to effect the movement of certain armatures thereof to open the circuits normally completed through the relay contacts, the said switching means being also adapted to apply a greater potential to the windings of each circuit-controlling relay to effectively lock one of its armatures with the armature of the said locking relay.

5. In an arrangement for determining the condition of insulation of an electrical transmission system, the combination with a cable comprising a plurality of sections, each consisting of a plurality of insulated conductors enclosed in a sheath, the said sections being spliced together, a circuit-controlling relay and a locking relay at certain of said splicing points, the armatures of the circuit-controlling relay being connected with certain of said conductors in the cable section lying on one side of said relay and the contacts of the same relay being connected with certain conductors on the other side thereof, switching means to apply a potential to the winding of each circuit-controlling relay to effect the movement of certain armatures thereof to open the circuits normally completed through the relay contacts, the said switching means being also adapted to apply a greater potential to the windings of each circuit-controlling relay to effectively lock one of its armatures with the armature of the said locking relay, and a second switching means adapted to apply a potential to the winding of the said locking relay to release the armature of the circuit-controlling relay.

In testimony whereof, I have signed my name to this specification this 4th day of January 1926.

JOHN B. MURPHY.